(12) United States Patent
Kim (10) Patent No.: US 11,113,563 B2
(45) Date of Patent: Sep. 7, 2021

(54) APPARATUS FOR DETECTING OBJECT AND METHOD THEREOF

(71) Applicants: HYUNDAI MOTOR COMPANY, Seoul (KR); KIA MOTORS CORPORATION, Seoul (KR)

(72) Inventor: Young Hyun Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 301 days.

(21) Appl. No.: 16/296,017

(22) Filed: Mar. 7, 2019

(65) Prior Publication Data
US 2020/0143199 A1 May 7, 2020

(30) Foreign Application Priority Data
Nov. 5, 2018 (KR) .......................... 10-2018-0134647

(51) Int. Cl.
| | |
|---|---|
| *G06K 9/62* | (2006.01) |
| *G06K 9/72* | (2006.01) |
| *G06K 9/46* | (2006.01) |
| *G06N 3/08* | (2006.01) |
| *G06N 3/04* | (2006.01) |
| *G06K 9/03* | (2006.01) |
| *G06K 9/00* | (2006.01) |

(52) U.S. Cl.
CPC ............. *G06K 9/6217* (2013.01); *G06K 9/03* (2013.01); *G06K 9/46* (2013.01); *G06K 9/6228* (2013.01); *G06K 9/72* (2013.01); *G06N 3/04* (2013.01); *G06N 3/08* (2013.01); *G06K 9/00791* (2013.01)

(58) Field of Classification Search
CPC .. G06K 9/03; G06K 9/46; G06K 9/72; G06K 9/6217
See application file for complete search history.

(56) References Cited

U.S. PATENT DOCUMENTS

| | | | |
|---|---|---|---|
| 2017/0206441 A1* | 7/2017 | Miyano | ..................... G06T 7/70 |
| 2019/0258895 A1* | 8/2019 | Sacheti | .................. G06F 16/51 |
| 2020/0139973 A1* | 5/2020 | Palanisamy | ..... B60W 30/18163 |
| 2020/0272888 A1* | 8/2020 | Wang | .................. G06N 3/0454 |

OTHER PUBLICATIONS

Simonyan et al., "Very Deep Convolutional Networks for Large-Scale Image Recognition", ICLR 2015, ArXiv: 1409.1556,—14 pages (Apr. 10, 2015).
Ren et al., "Faster R-CNN: Towards Real-Time Object Detection with Region Proposal Networks", Microsoft Research,—9 pages (May 7, 2015).

(Continued)

*Primary Examiner* — Myron Wyche
(74) *Attorney, Agent, or Firm* — Mintz Levin Cohn Ferris Glovsky and Popeo, P.C.; Peter F. Coriess (57) ABSTRACT

An apparatus for detecting an object includes a processor that extracts information for object detection from image data frames based on a hierarchical structure of a convolutional neural network (CNN) and transmits information for object detection extracted from an uppermost layer of the hierarchical structure to a lower layer to detect an object based on information received at each layer, and storage that stores the information for object detection and detected object information.

17 Claims, 11 Drawing Sheets

(56) References Cited

OTHER PUBLICATIONS

Yoo et al., "Attentionnet: Aggregating Weak Directions for Accurate Object Detection", KAIST—9 pages (Dec. 11, 2015).
He et al., "Deep Residual Learning for Image Recognition", Microsoft Research—9 pages (Jun. 26, 2015).
Redmon et al., "You Only Look Once: Unified, Real-Time Object Detection", University of Washington—10 pages (Jun. 26, 2016).
Liu et al., "SSD: Single Shot MultiBox Detector", UNC Chapel Hill, arXiv:1512.02325v5—17 pages (Dec. 29, 2016).
Iandola et al., "Squeezenet: Alexnet-Level Accuracy With 50x Fewer Parameters and <0.5MB Model Size", ICLR 2017, arXiv:1602.07360v4—13 pages (Nov. 4, 2016).
Dai et al., "R-FCN: Object Detection via Region-based Fully Convolutional Networks", 30th Conference on Neural Information Processing Systems (NIPS) (Dec. 5, 2016)—9 pages.
Fu et al., "DSSD: Deconvolutional Single Shot Detector", UNC Chapel Hill, arXiv:1701.06659v1—11 pages (Jan. 23, 2017).
Howard et al., "MobileNets: Efficient Convolutional Neural Networks for Mobile Vision Applications", Google, arXiv.:1704.04861v1—9 pages (Apr. 17, 2017).
Jeong et al., "Enhancement of SSD by concatenating feature maps for object detection", Seoul National University, arXiv:1705.09587v1—12 pages (May 26, 2017).
Hu et al., "Finding Tiny Faces", Carnegie Mellon University—9 pages (Jul. 21, 2017).
Kong et al., "RON: Reverse Connection with Objectness Prior Networks for Object Detection", Tsinghua University—9 pages (Jul. 21, 2017).
Dvornik et al., "BlitzNet: A Real-Time Deep Network for Scene Understanding", Inria—9 pages (Oct. 22, 2017).
Zhang et al., "Single-Shot Object Detection with Enriched Semantics", John Hopkins University—9 pages (Jun. 18, 2018).
Zhou et al., "Scale-Transferrable Object Detection", Shanghai Jiao Tong University—10 pages (Jun. 18, 2018).

* cited by examiner

FIG. 11

APPARATUS FOR DETECTING OBJECT AND METHOD THEREOF

CROSS-REFERENCE TO RELATED APPLICATION

This application is based on and claims the benefit of priority to Korean Patent Application No. 10-2018-0134647, filed on Nov. 5, 2018, in the Korean Intellectual Property Office, the disclosure of which is incorporated herein in its entirety by reference.

TECHNICAL FIELD

The present disclosure relates to an apparatus for detecting an object and a method thereof, and more particularly, to a technology of performing prediction by performing convolutional neural network (CNN) based object detection.

BACKGROUND

An object is detected from image data, and the result is used in various fields such as CCTV reading, crime judgment, determination of obstacles around a vehicle, and the like by analyzing and recognizing the detected object.

In particular, as a technology of a vehicle is developed, a technology for detecting an object from image data or the like around the vehicle and controlling the vehicle accordingly is provided. In the object recognition technology related to such vehicle control, the accuracy is very important because the accuracy is directly related to the safety of a vehicle.

SUMMARY

The present disclosure provides an apparatus for detecting an object which is capable of accurately detecting a small object based on a hidden state top-down (HSTD) structure and a recursive prediction module (RPM), and a method thereof.

One aspect of the present disclosure provides an apparatus for detecting an object, which includes a processor that extracts information for object detection from image data frames based on a hierarchical structure of a convolutional neural network (CNN) and transmits information for object detection extracted from an uppermost layer of the hierarchical structure to a lower layer to detect an object based on information received at each layer, and storage that stores the information for object detection and detected object information.

The processor may detect the object in an one-stage scheme.

The processor may correct the detected object information by using the information for object detection.

The information for object detection may include feature information for large object detection and contextual information for small object detection.

The processor may include a backbone network for extracting feature information for object detection and contextual information from the image data frames.

The backbone network may include a scale-based hierarchical feature structure for each of the image data frames, substitute time-series data for data for each scale of the scale-based hierarchical feature structure, and output the time-series data.

The processor may further include a hidden state top-down structure (also referred to herein as hidden state top-down or HSTD) for receiving the feature information and the contextual information extracted for each layer of each image data frame.

The hidden state top-down may include a plurality of hidden state layers corresponding to a layer of the backbone network, and an uppermost hidden state layer may sequentially transmit the contextual information received from the layer of the backbone network to a hidden state layer of the lower layer.

The hidden state top-down may include a first hidden state layer that performs the object detection by using first feature information and first contextual information which are received from a first layer which is an uppermost layer of the backbone network, a second hidden state layer that performs the object detection by using the first contextual information received from the first hidden state layer and second feature information and second contextual information received from a second layer of the backbone network, and a third hidden state layer that performs the object detection by using the first contextual information and the second contextual information received from the second hidden state layer, and third feature information and third contextual information received from a third layer of the backbone network.

The processor may further include a recursive prediction module that receives the feature information and the contextual information from the hidden state top-down to correct a detection result received from the hidden state top-down.

The recursive prediction module may repeatedly perform the correction of the detection result.

The recursive prediction module may remove a feature corresponding to a background of a detection result by the hidden state top-down by using an attention mask.

Another aspect of the present disclosure provides a method of detecting an object, which includes extracting information for object detection from image data frames based on a hierarchical structure of a convolutional neural network (CNN), and transmitting information for object detection extracted from an uppermost layer of the hierarchical structure to a lower layer to detect an object based on information received at each layer.

The method may further include correcting the detected object information by using the information for object detection.

The extracting of the information for the object detection may include, in a backbone network having a scale-based hierarchical feature structure for each of the image data frames, substituting time-series data for data for each scale of the scale-based hierarchical feature structure.

The detecting of the object may include receiving feature information and contextual information extracted for each layer of the backbone network, and detecting, by a plurality of hidden state layers corresponding to a layer of the backbone network, the object based on the feature information and the contextual information received from the layer of the backbone network.

The detecting of the object may further include sequentially transmitting, by an uppermost hidden state layer among the plurality of hidden state top-down layers, the contextual information received from the layer of the backbone network to a hidden state layer of the lower layer.

The sequential transmitting of the contextual information to the hidden state layer of the lower layer may include performing the object detection by using first feature information and first contextual information which are received from a first layer which is an uppermost layer of the backbone network in a first hidden state layer among the plurality of hidden state top-down layers, performing the object detection in a second hidden state layer among the plurality of hidden state top-down layers by using the first contextual information received from the first hidden state layer and second feature information and second contextual information received from a second layer of the backbone network, and performing the object detection in a third hidden state layer among the plurality of hidden state top-down layers by using the first contextual information and the second contextual information received from the second hidden state layer and third feature information and third contextual information received from received from a third layer of the backbone network.

The correcting of the detected object information may include receiving the feature information and the contextual information from the hidden state top-down layer to correct a detection result received from the hidden state top-down layer.

The correcting of the detected object information may include removing a feature corresponding to a background of a detection result by the hidden state top-down by using an attention mask.

According to the present technology, it may be possible to accurately detect a small object on a hidden state top-down (HSTD) structure and a recursive prediction module (RPM).

In addition, various effects that are directly or indirectly understood through the present disclosure may be provided.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the present disclosure, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

One object detection technology is object detection technology through an artificial intelligence network and uses a one-stage object detection scheme of a bottom-up network structure. However, it is difficult to detect a small object in such a one-stage object detection scheme of a bottom-up structure.

Hereinafter, embodiments of the present disclosure will be described in detail with reference to FIGS. 1 to 11.

Figure 1:
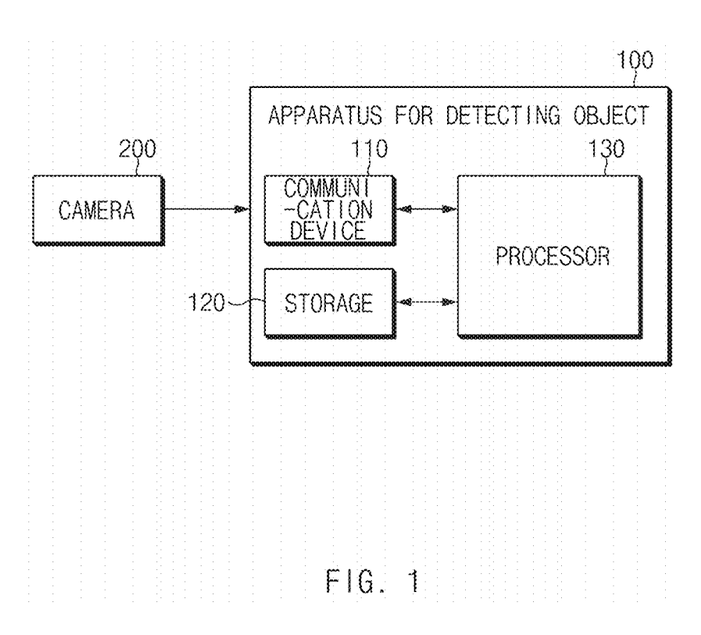
FIG. 1 is a block diagram illustrating a configuration of an apparatus for detecting an object according to an embodiment of the present disclosure.

FIG. 1 is a block diagram illustrating a configuration of an apparatus for detecting an object according to an embodiment of the present disclosure.

An apparatus 100 for detecting an object may extract feature information and contextual information based on a convolutional neural network (referred to as 'CNN') and accurately detect a small object by using a hidden state top-down (HSTD) structure and a recursive prediction module (RPM) based on a recurrent neural network (RNN). That is, the apparatus 100 for detecting an object may extract information for object detection from image data frames based on a hierarchical structure of the CNN and transmit the information for object detection extracted from an uppermost layer of the HSTD structure to a lower layer to detect an object based on information received at each layer. The recursive prediction module may perform accurate object detection by correcting the detected object information.

Figure 3:
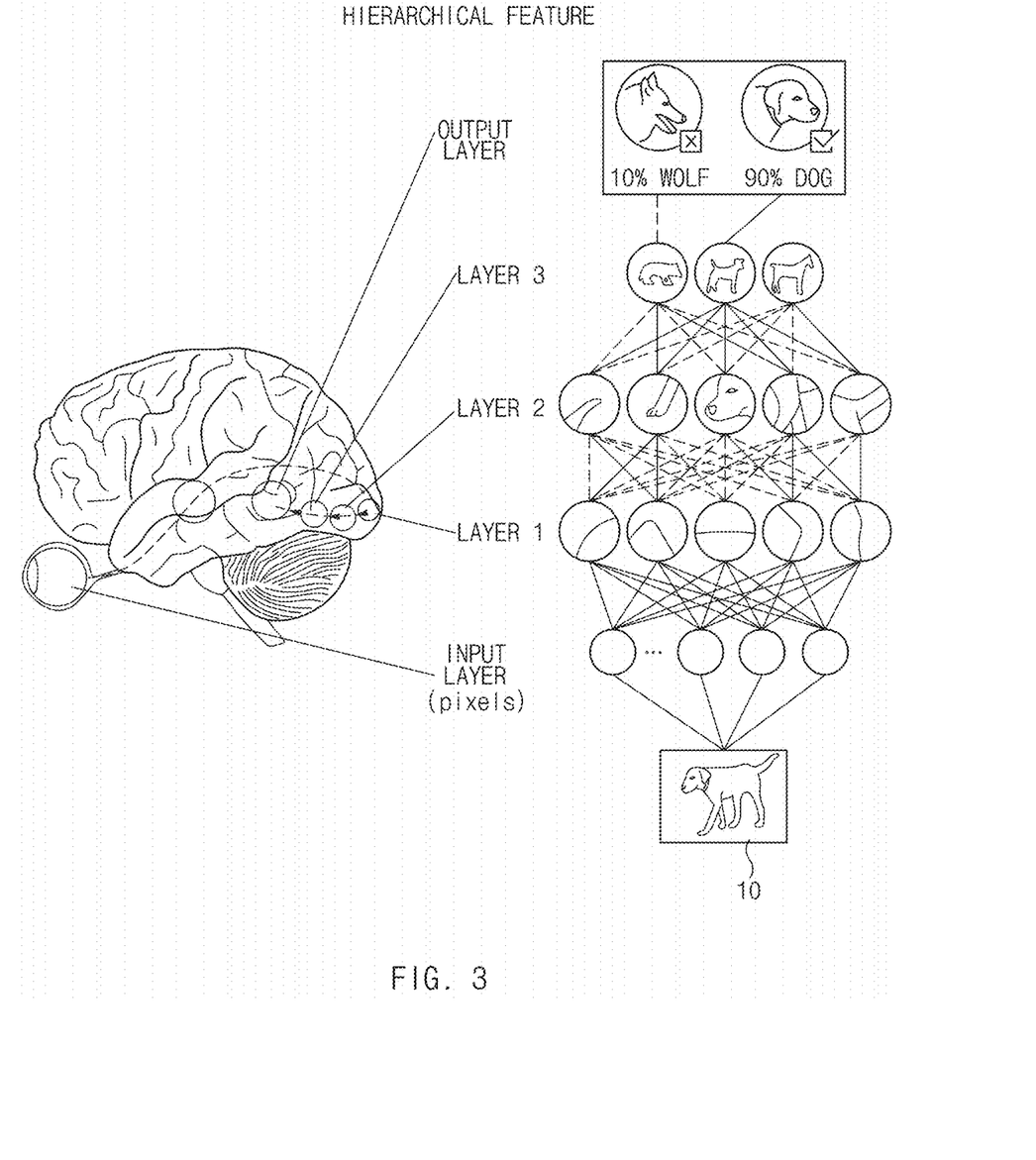
FIG. 3 is a view illustrating an operation of extracting hierarchical feature information of a backbone network according to an embodiment of the present disclosure.

The feature information refers to a hierarchical feature. In order for a human to perceive an object, each region of the brain obtains edge information from visual information obtained from the eyes, obtains more complex structure information by combining the edge information, and obtains the whole information of the object by combining the structure information step by step. The feature obtained from the lower stage feature such as an edge to the higher stage representing the entire object may be referred to as a hierarchical feature. As seen in FIG. 3, similarly to the hierarchical learning of each region of the brain, the CNN also learns hierarchical information to recognize an image. In the CNN, the hierarchical feature is learned step by step by using a layer composed of several stages. For example, a "dog" may become an object in data on the image obtained by photographing the 'dog" and the "dog" may be detected as an object through the feature information on the "dog".

When the hierarchical feature is a feature required for analyzing an object in an image, the contextual information may be understood as the analysis information on the entire image. In case of object detection, it is necessary to predict not only the type of an object located in the image but also the position. When the layer information of a surrounding region is used to detect a small object at a long distance from an image, it is impossible to extract a feature sufficient to analyze an object of which the area is small and the image is indistinct. However, when the contextual information of the whole image such as information on objects distributed around is utilized, it may be easy to identify a small object at a long distance. This is the same principle as a human being identifies distant objects.

In this case, the CNN, which is a kind of a deep neural network (DNN), includes one or several convolutional layers, a pooling layer, fully connected layers. The CNN may have a structure suitable for learning of two-dimensional data and may be trained through a backpropagation algorithm. In the present disclosure, the CNN is configured with a CNN-based backbone network.

The RNN, which is a deep learning model for learning data that changes with time, such as time-series data, receives data at a reference time 't' and a next time (t+1) as inputs. As examples of the time-series data, there are a t-th frame image and a (t+1)-th frame image in a video, and a t-th word and a (t+1)-th word in a sentence. The RNN is an artificial neural network (ANN) composed of networks to analyze sequential information, such as a change in image or a relationship between words, from such an input, where the object may include a vehicle, a nearby obstacle, a person, an animal, a building, and the like. The apparatus 100 for detecting an object may receive image data from a camera 200. In this case, the camera 200 may be mounted outside a vehicle, and may be mounted on the front, rear, and side of a vehicle.

Referring to FIG. 1, in one embodiment, the apparatus 100 for detecting an object according to an embodiment of the present disclosure may include a communication device 110, storage 120, and a processor 130. In another embodiment, the apparatus may include two or more processors.

The communication device 110 may be a hardware device implemented with various electronic circuits for transmitting and receiving a signal through a wireless or wired connection. In the present disclosure, the communication device 110 may perform in-vehicle communication through CAN communication, LIN communication, or the like.

The storage 120 may store image data received from the camera 200, an artificial neural network learning algorithm for object detection, a learning result and an object detection result by the processor 130, and the like. The storage 120 may include a storage medium having at least one type of a flash memory type, a hard disk type, a micro type, a card type of a memory (for example, an secure digital (SD) card, an eXtream digital (XD) card, or the like), RAM (Random Access Memory), SRAM (Static RAM), ROM (Read-Only Memory), EEPROM (Electrically Erasable Programmable Read-Only Memory), PROM (Programmable Read-Only Memory), MRAM (Magnetic RAM), a magnetic disc, and an optical disc.

The processor 130 may be electrically connected to the communication device 110 and the storage 120, and may electrically control each component. The processor 130 may be a circuit that executes software commands and may perform various data processing and calculations described below.

The processor 130 extracts feature information and contextual information from image data by using an algorithm learned based on CNN, which is a kind of deep neural network, and uses the feature information and contextual information based on the RNN to detect and correct the object. In this case, the contextual information of all the image data extracted from the uppermost layer may be transmitted to a lower layer, such that a small object may be accurately detected by using the contextual information when an object is detected in a lower layer.

The processor 130 detects an object in an one-stage manner. That is, the processor 130 may include a basic neural network called a backbone network and an additional neural network called a prediction module. For example, the feature information and contextual information may be extracted from the image data in the backbone network and an object may be detected based on the feature information and contextual information in the prediction module.

The processor 130 may constitute a backbone network having a scale-based hierarchical structure for each instantaneous image data. The processor 130 may replace the data for each scale with time-series data through the backbone network to provide the data to an RNN-based prediction module.

The processor 130 may extract the feature information for detecting a large object and the contextual information for detecting a small object from the image data and provide the extracted feature information and contextual information to the prediction module.

The prediction module of the processor 130 may include a hidden state top-down for receiving the feature information and the contextual information extracted from each layer of each image data frame, and the hidden state top-down may include a plurality of hidden state layers corresponding to layers of the backbone network. The uppermost hidden state layer may be operated in such a top-down structure that the contextual information received from a layer of the backbone network is sequentially transmitted to the hidden state layer of the lower layer.

The processor 130 may receive the feature information and the contextual information from the hidden state top-down and correct the detection result received from the hidden state top-down.

The processor 130 may correct the object information detected by using the information for object detection, and increase the accuracy of object detection by repeating the correction operation. When a detection area for object detection is selected, the processor 130 may adjust the size of the detection area or the location of the detection area to perform the correction, and remove a background image (noise) except for the detection area by using an attention mask. That is, the processor 130 may remove a feature corresponding to the background of the detection result by the hidden state top-down by using the attention mask.

Figure 2:
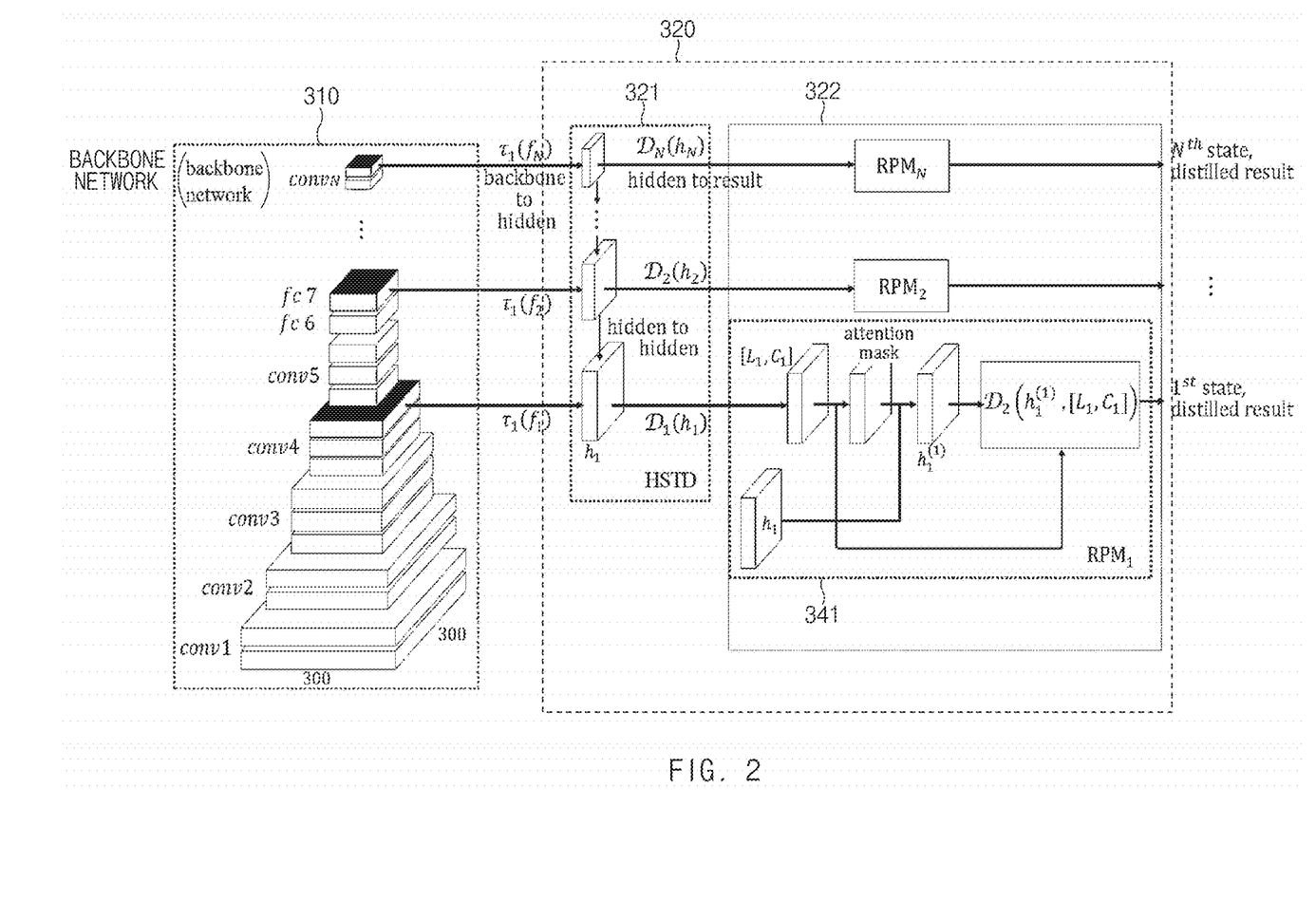
FIG. 2 is a view illustrating a detailed configuration of the processor of FIG. 1.

FIG. 2 is a view illustrating a detailed configuration of the processor of FIG. 1.

Referring to FIG. 2, the processor 130 for detecting an object according to an embodiment of the present disclosure includes a CNN-based backbone network 310 and an RNN-based prediction module 320.

The backbone network 310 is based on a CNN-based backbone network. When image data are inputted, the backbone network 310 may extract the feature information and the contextual information from the frames of the image data every moment. In this case, the backbone network 310 may construct the image data in a hierarchical structure based on not a time series but a scale, and the uppermost layer ($conv_N$) thereof may include contextual information of the entire image data. In addition, the backbone network 310 may construct a hierarchical structure of $conv_1$, $conv_2$, . . . , $conv_N$, and transmit feature information and contextual information, which are characterized for each layer, to the prediction module 320. In addition, each scale of the image data at every moment is referred to as a "state" and the feature information extracted for each state is transmitted to each of the hidden state layers $h_1, h_2, \ldots, h_N$ of a hidden state top-down (HSTD) structure 321 (also referred to herein as HSTD 321). For example, the feature maps f1, f2, ... fn in several scales may be generated from the frames at every moment, each of which may be considered as a state.

The prediction module 320 includes the HSTD 321 and a recursive prediction module (RPM) 322.

The HSTD 321 includes a plurality of hidden state layers $h_1, h_2, \ldots, h_N$ based on RNN, and the hidden state layers $h_1, h_2, \ldots, h_N$ analyze and detect an object by using the feature information and the contextual information received from each layer $conv_1, conv_2, \ldots, conv_N$ of the backbone network 310.

In this case, the hidden state layers $h_1, h_2, \ldots, h_N$ have a top-down structure. The uppermost hidden state layer (a first hidden state layer $h_N$) transmits the feature information and the contextual information extracted from the uppermost layer ($conv_N$) of the backbone network 310 to the hidden state layer (a second hidden state layer, $h_{N-1}$) immediately below. Then, the hidden state layer $h_{N-1}$ performs learning by using the feature information and the contextual information received from the next higher hidden state layer $conv_{N-1}$ of the backbone network and the feature information and the contextual information received from the hidden layer $h_N$, and the received feature information and contextual information $h_{N-1}$ and $h_N$ to a lower hidden state layer (a third hidden state layer $h_{N-2}$). As described above, the HSTD 321 may effectively propagate the feature information and contextual information extracted from the uppermost layer of the backbone network to the lowest layer, and allow each lower layer to use the contextual information of the uppermost layer for the object detection, thereby detecting even a small object.

In addition, the HSTD 321 may store the contextual information received from the previous state, that is, an upper hidden state layer, and extract the sequential information by comparing the received contextual information with the contextual information received at the feature extraction part 310. In such a structure, one structure may process different features separately based on the hidden state, rather than learning instantaneous information and sequential information at the same time.

The RPM 322 may correct the object detection result received from the HSTD 321 to perform accurate object detection.

As described above, according to the present disclosure, an object may be detected in the combining structure of the CNN-based backbone network 310, and the HSTD 321 and the RPM 322 based on the RNN, so that it is possible to improve the reliability of a vehicle control technology (e.g., autonomous driving) using the object detection result by increasing the accuracy of the object detection.

In addition, according to the present disclosure, it is possible to perform accident and risk prediction such as crime prediction, traffic accident prediction, and the like about the detected object by interworking with a deep network for object recognition and a deep network for accident prediction.

Figure 4:
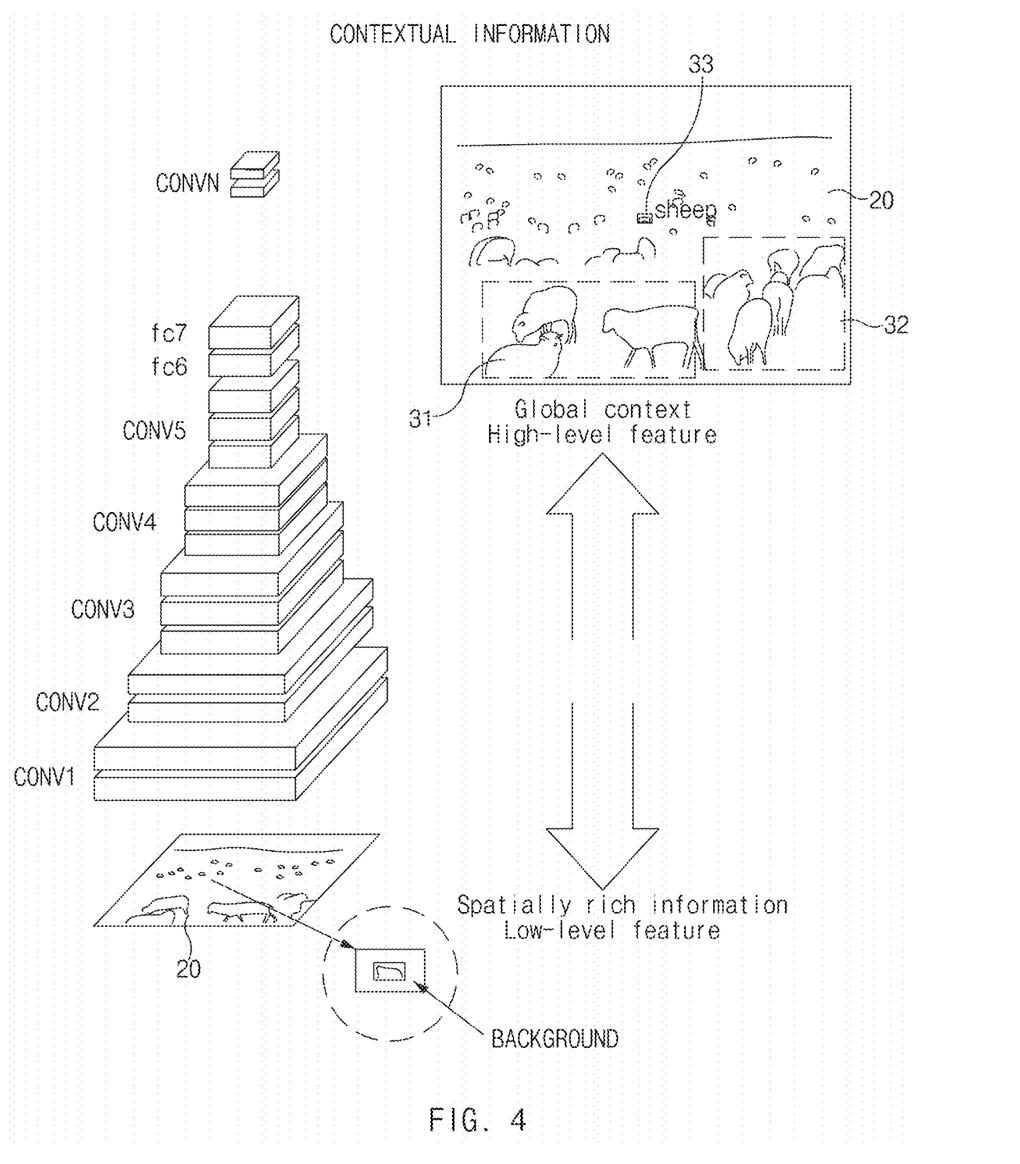
FIG. 4 is a view illustrating an operation of extracting feature information of a backbone network according to an embodiment of the present disclosure.

FIG. 3 is a view illustrating a hierarchical feature of the backbone network 310 of FIG. 2. FIG. 4 is a view illustrating an operation of extracting contextual information of the backbone network 310 according to an embodiment of the present disclosure.

As shown in FIG. 3, the backbone network 310, which is based on CNN, includes an input layer, a plurality of layers (layer 1, layer 2, and layer 3), and an output layer. When image data 10 having a dog as an object is input to the input layer every frame, edge information is extracted from the frame of each image data in the layer 1. In the layer 2, feature information is extracted from each image data, and in the layer 3, an overall feature is extracted. Thus, it is possible to determine whether the object in the image data is a dog or a wolf, based on the overall feature.

Referring to FIG. 4, the backbone network 310 accumulates image data 20 input every frame in a stack format based on a scale rather than a time series. Each layer replaces the scale data with the time series data and provides the time series data to the prediction module 320. Each of the layers $conv_1, conv_2, \ldots, conv_N$ may be composed of image data of each frame, and the backbone network 310 may extract the feature information and the contextual information from the image data of each frame.

In FIG. 4, it is possible to determine that large objects 31 and 32 is sheep through the feature information of the image data including a picture in which dozens of sheep are located on grassland. However, to detect a small object 33, the contextual information (background, location information) can be used. For example, the contextual information of the entire image may be analyzed in order to detect a small object. In some implementations, the information about contextual information of the entire image is not transmitted to a lower layer. Alternatively, some embodiments of the present disclosure are implemented in the top-down structure in which the contextual information on the entire image of an upper layer image is transmitted to a lower layer, such that it is easy to detect even a small object.

Since the area occupied by the small object 33 is small, it may be difficult to extract distinct features from the object area. The dependency on surrounding contextual information is large when recognizing the small object 33 rather than recognizing the large object 31. To use such contextual information, the top-down structure is appropriate because it is difficult to provide contextual information sufficient to recognize objects in the lower layers used to detect small objects in the bottom-up structure.

Figure 5:
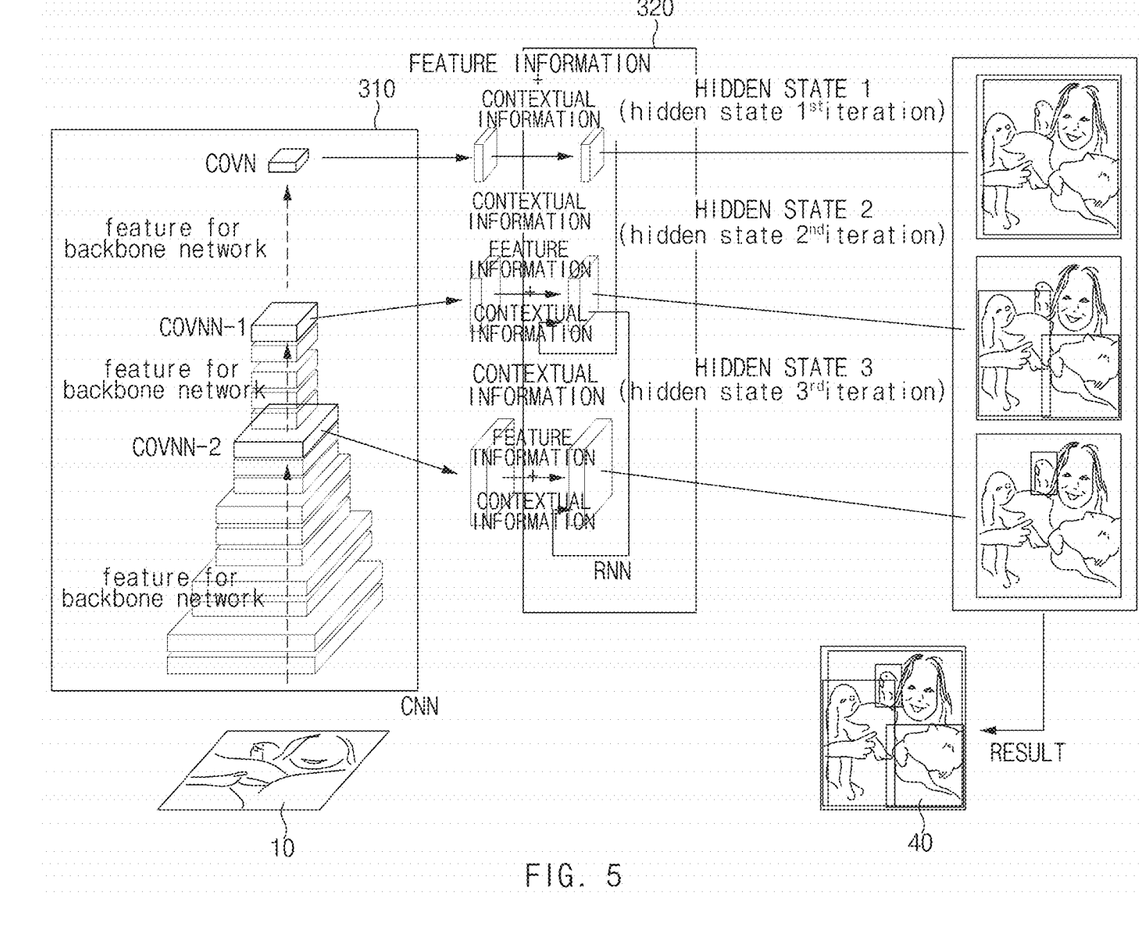
FIG. 5 is a view illustrating an operation of a hidden state top-down structure for object detection according to an embodiment of the present disclosure.

FIG. 5 is a view illustrating an operation of a hidden state top-down layer for object detection according to an embodiment of the present disclosure.

Referring to FIG. 5, the feature information and the contextual information may be extracted from each layer of the feature extraction part 310 and transmitted to a plurality of hidden state layers h1, h2, ..., $h_N$, respectively. The hidden state layers h1, h2, ..., $h_N$ may analyze and detect an object based on the feature information and contextual information of the corresponding layer. Each of the hidden state layers h1, h2, ..., $h_N$ may transmit the contextual information stored therein to the hidden state layer directly below it, such that the contextual information of the uppermost layer is transmitted to the lowest layer.

Thus, each of the hidden state layers h1, h2, ..., $h_N$ may detect an object by using not only the feature information and the contextual information received from the corresponding layer of the feature extraction part 310 but also the contextual information of the uppermost layer of the feature extraction part 310. Thus, the contextual information of the uppermost layer may include the contextual information for the entire image, so that the apparatus 100 for detecting an object may detect even a small object in the entire image.

In FIG. 5, layers represented in dark gray, that is, layers $conv_{N-2}, conv_{N-1}, \ldots, conv_N$ are layers selected to be used for object detection while constituting the backbone network. Each layer is considered as a state in the hidden state top-down (HSTD) layer. As the feature information is extracted from the instantaneous image data in the RNN, the layers in each state store the hierarchical feature necessary for constructing the network.

A hidden-to-hidden path of the HSTD stores the feature extracted in a previous state which is an upper layer and then, combines the feature with the feature of a lower layer that is a current state. Through this process, the contextual information may be propagated from an upper layer to a lower layer. Through the top-down propagation of contextual information, it is possible to detect a small object such as a traffic light, a sign, or the like well, which performs an important function of improving the performance of an object detector for autonomous driving.

Figure 6:
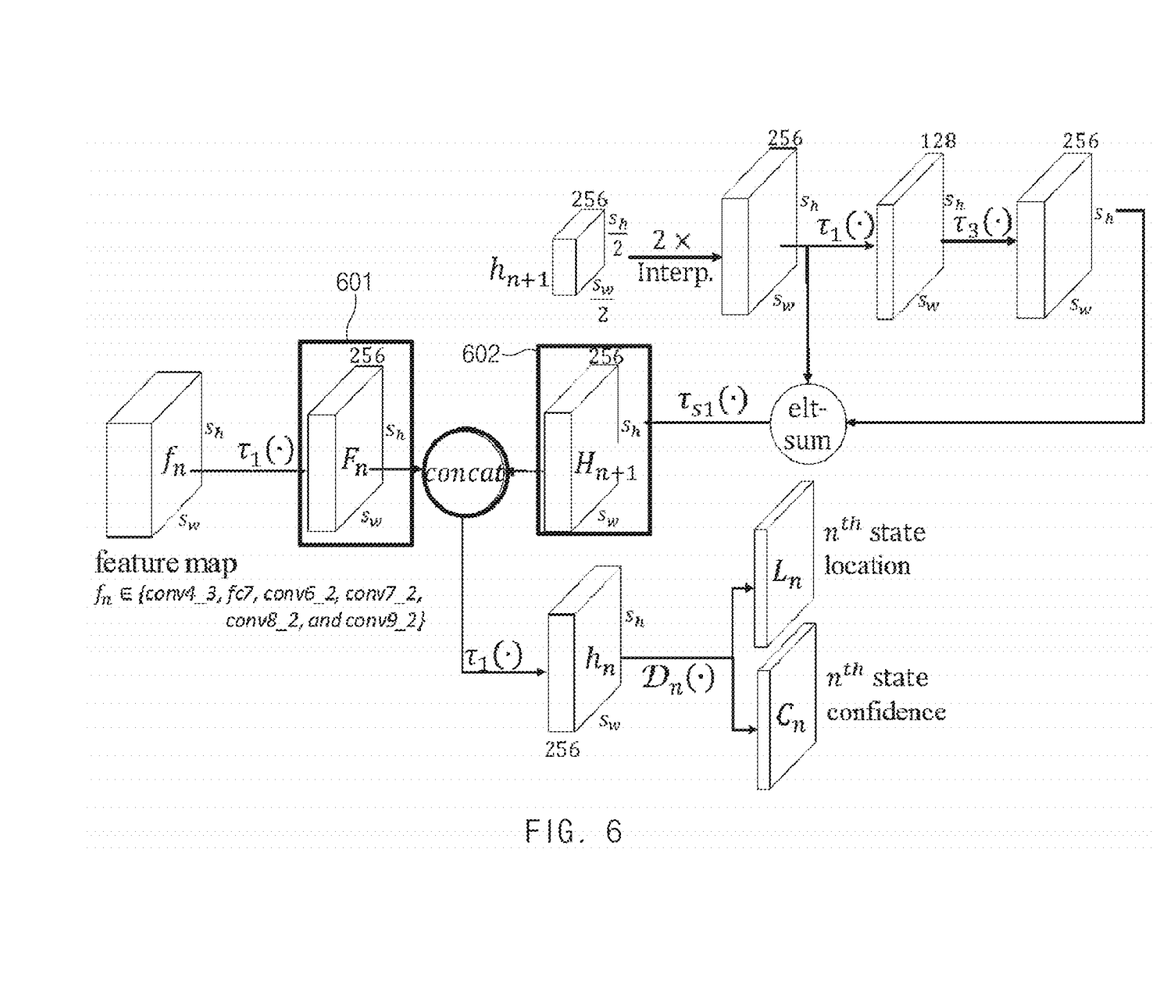
FIG. 6 is a view illustrating a detailed structure of a hidden state top-down structure according to an embodiment of the present disclosure.

FIG. 6 is a view illustrating a detailed structure of a hidden state top-down structure according to an embodiment of the present disclosure.

Referring to FIG. 6, in the hidden state structure of the RNN according to some implementations, each of the feature information F_n 601 and the contextual information H_(n+1) 602 may have 256 channels, and the loss of redundant information may be brought by applying an element-wise sum of the feature information and the contextual information. As shown in FIG. 6, in the HSTD structure of the present disclosure, since each of the feature information F_n 601 and the contextual information H_(n+1) 602 has 256 channels and two feature maps (e.g., feature information+contextual information) are concatenated through concatenation to form 512 channels, the (n+1)-th state, that is, the contextual information of an upper layer, may be propagated to a lower layer well without any loss.

Figure 7:
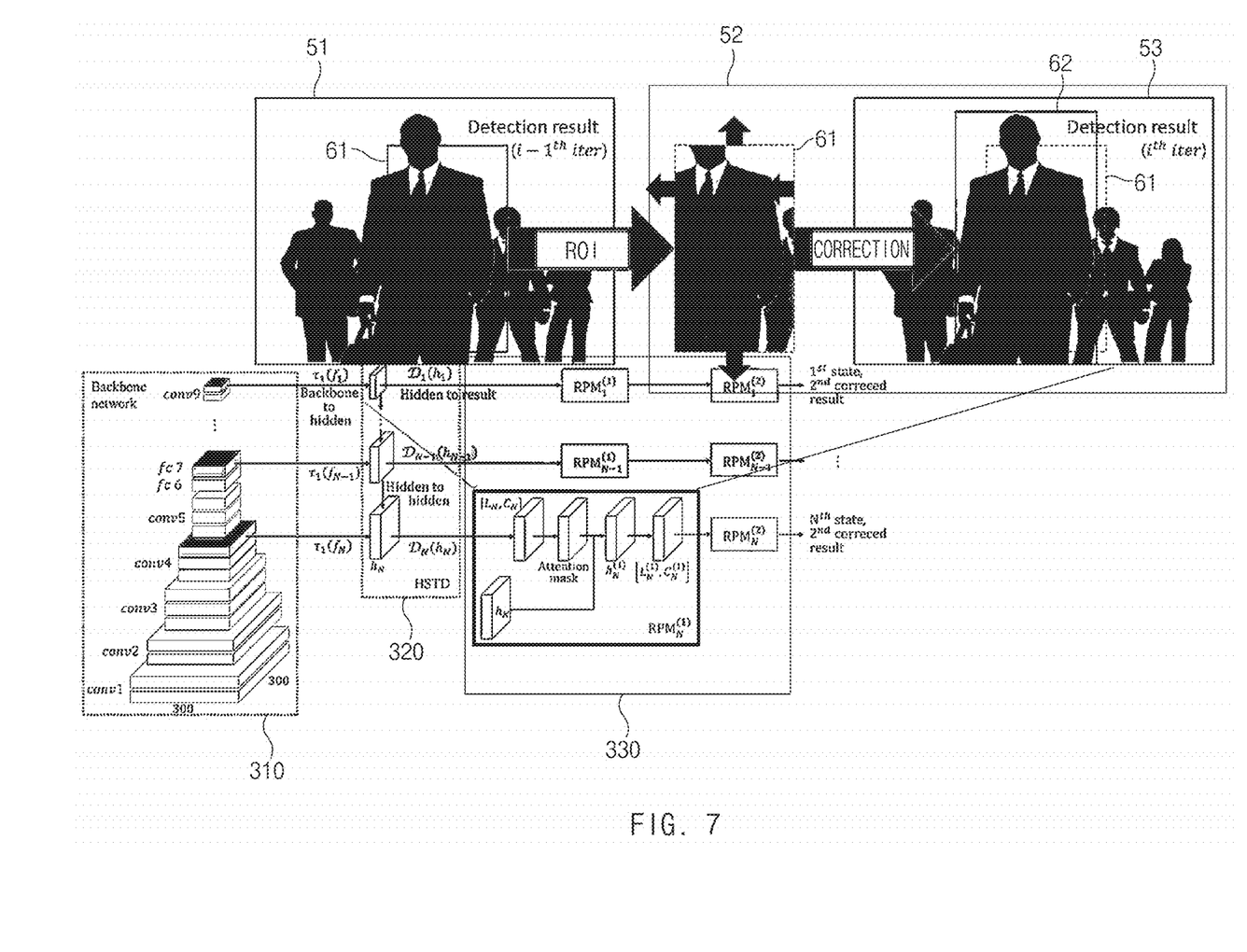
FIG. 7 is a structural diagram of a recursive prediction module for detecting an object according to an embodiment of the present disclosure.
Figure 8:
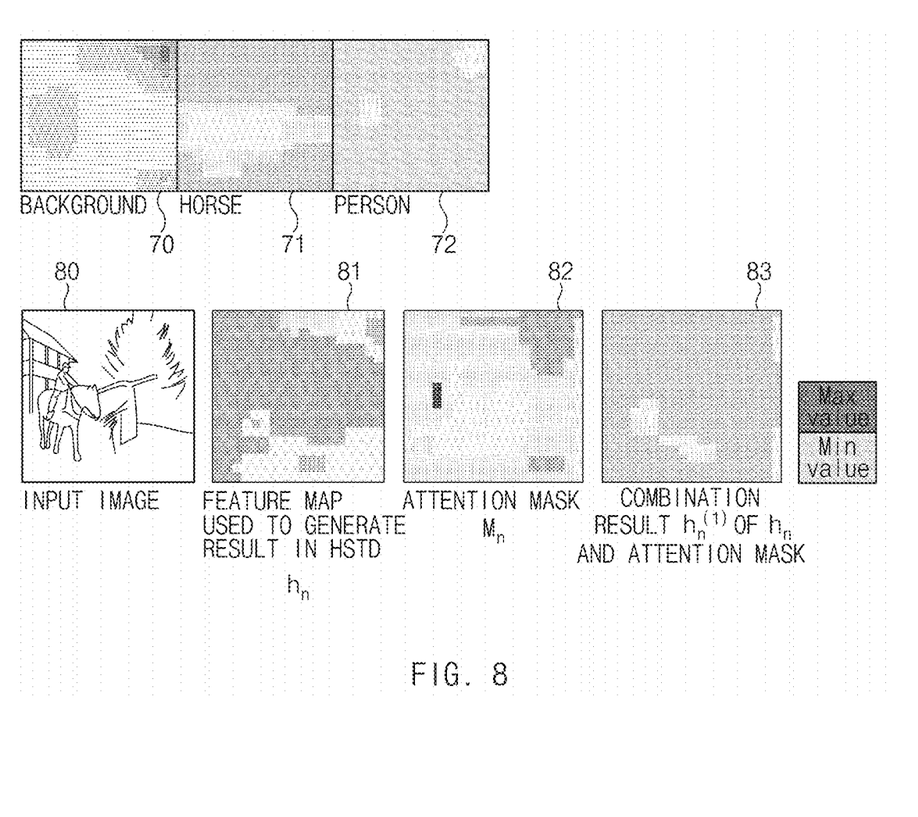
FIG. 8 is a view illustrating an example of a result of applying a recursive prediction module according to an embodiment of the present disclosure.

FIG. 7 is a structural diagram of a recursive prediction module for detecting an object according to an embodiment of the present disclosure, and FIG. 8 is a view illustrating an example of a result of applying a recursive prediction module according to an embodiment of the present disclosure.

Referring to FIG. 7, when a detection area ROI 61 estimated as an object is set through the HSTD 321, the RPM 322 may perform the correction based on the feature map (e.g., feature information+contextual information) received from the HSTD 321. It may be seen that a part of the object is expressed by being cut out in the detection area 61 of an image 51. Thus, when the detection area 61 is moved left and is vertically elongated as shown in an image 52, the detection area 62 may be corrected as shown in an image 53.

In addition, the RPM 322 may use an attention mask to remove an unnecessary background portion except for the detection area. The attention mask may be generated through the element-wise product of the feature map used to generate a result by the HSTD. This makes it possible to suppress the value of the background part which is not necessary in the feature map to produce an improved detection result. For example, the attention mask may not remove the background image itself but suppress the background part in the HSTD layer (feature map) for object detection. The RPM 322 may remove a feature corresponding to the background in the hidden layer necessary for object detection.

As shown in FIG. 7, the RPM 322 may be repeatedly provided to further increase the object detection accuracy.

Referring to FIG. 8, a background image 70, a horse 71, and a person 72 are shown when the probability value that each area is included in a kind of an object immediately after passing through the HSTD is '$C_n$'.

The attention mask $M_n$ 82 is combined with the feature map $h_n$ 81 used for generating the result in the HSTD through the input image 70 to output a combination result $h_n^{(1)}$ 83 of $h_n$ and the attention mask, so that it may be known that unnecessary background noise is removed.

Figure 9:
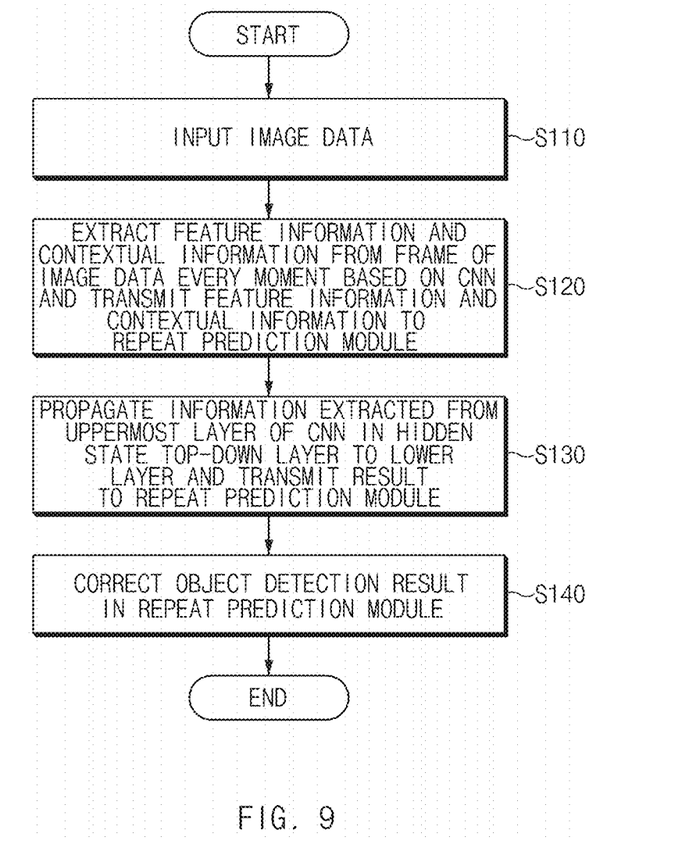
FIG. 9 is a flowchart illustrating a method of detecting an object according to an embodiment of the present disclosure.

Hereinafter a method of detecting an object according to an embodiment of the present disclosure will be described in detail with reference to FIG. 9. FIG. 9 is a flowchart illustrating a method of detecting an object according to an embodiment of the present disclosure.

Hereinafter, it is assumed that the apparatus 100 for detecting an object of FIG. 1 performs the process of FIG. 9. In addition, in the description of FIG. 9, it may be understood that the operations described as being performed by the apparatus are controlled by the processor 130 of the apparatus 100.

Referring to FIG. 9, when the image data is inputted in operation S110, in operation S120, the apparatus 100 for detecting an object constructs a backbone network by stacking image data based on a scale, and the backbone network extracts the feature information and the contextual information from each scale of image data every moment. In addition, the backbone network transmits feature information and the contextual information to each corresponding HSTD layer.

In operation S130, each HSTD layer analyzes and detects an object by using the feature information and the contextual information received from each layer of the backbone network, and the uppermost hidden state layer transmits the contextual information received thereby to a hidden state layer below such that the contextual information of the uppermost layer is transmitted from the uppermost hidden state layer to the lowest hidden state layer. Each hidden state layer may perform object analysis and detection by using the contextual information of the uppermost layer as well as the feature information and the contextual information received from each layer of the backbone network.

In operation S140, the RPM corrects the object analysis and detection result received from each hidden state layer. In this case, the RPM 322 may correct the object detection result by using the feature map (e.g., feature information+contextual information) received from each hidden state layer.

Figure 10:
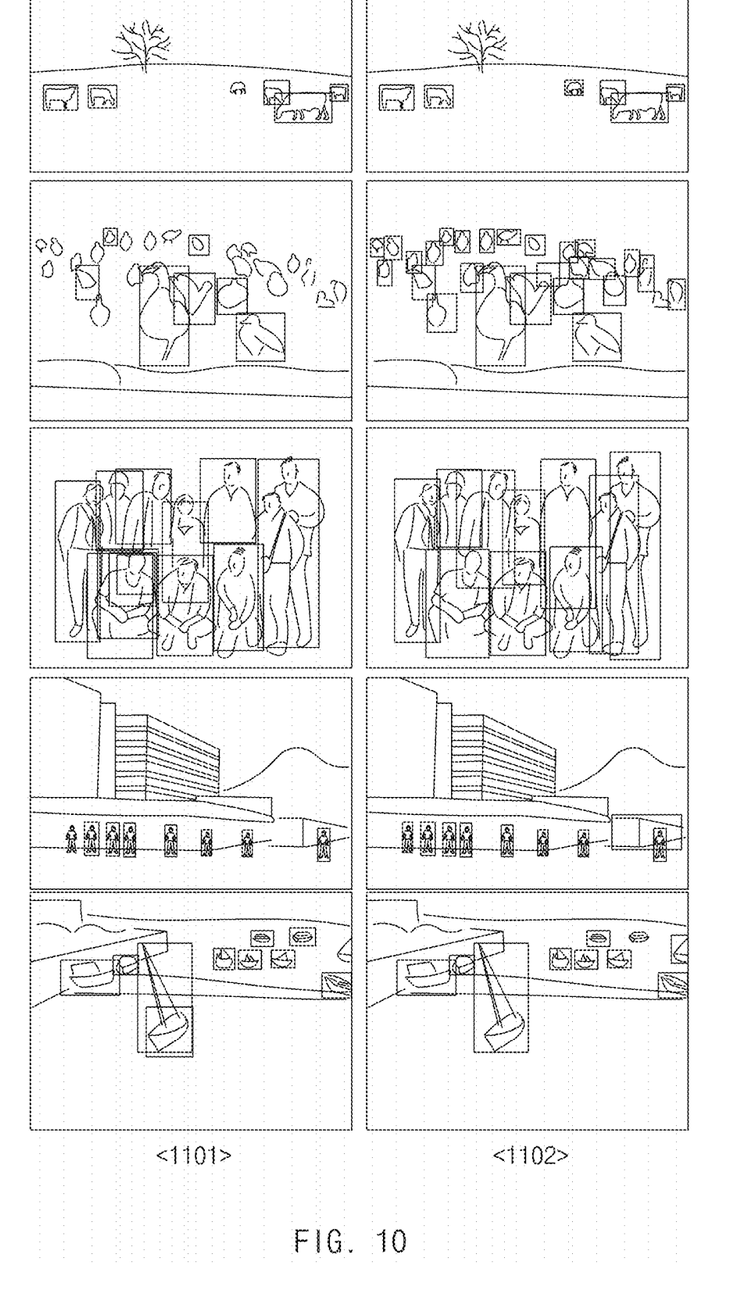
FIG. 10 is a view illustrating an example of an object detection result by a method of detecting an object according to an embodiment of the present disclosure.

FIG. 10 is a view illustrating an example of an object detection result by a method of detecting an object according to an embodiment of the present disclosure.

Referring to FIG. 10, reference numeral 1101 denotes a view of an object detection result when an object is detected based on an RNN. Reference numeral 1102 denotes a view of a result of detecting an object based on the HSTD structure and the RPM. It may be understood that a small object is more accurately detected in the view 1102 than the view 1101.

Figure 11:
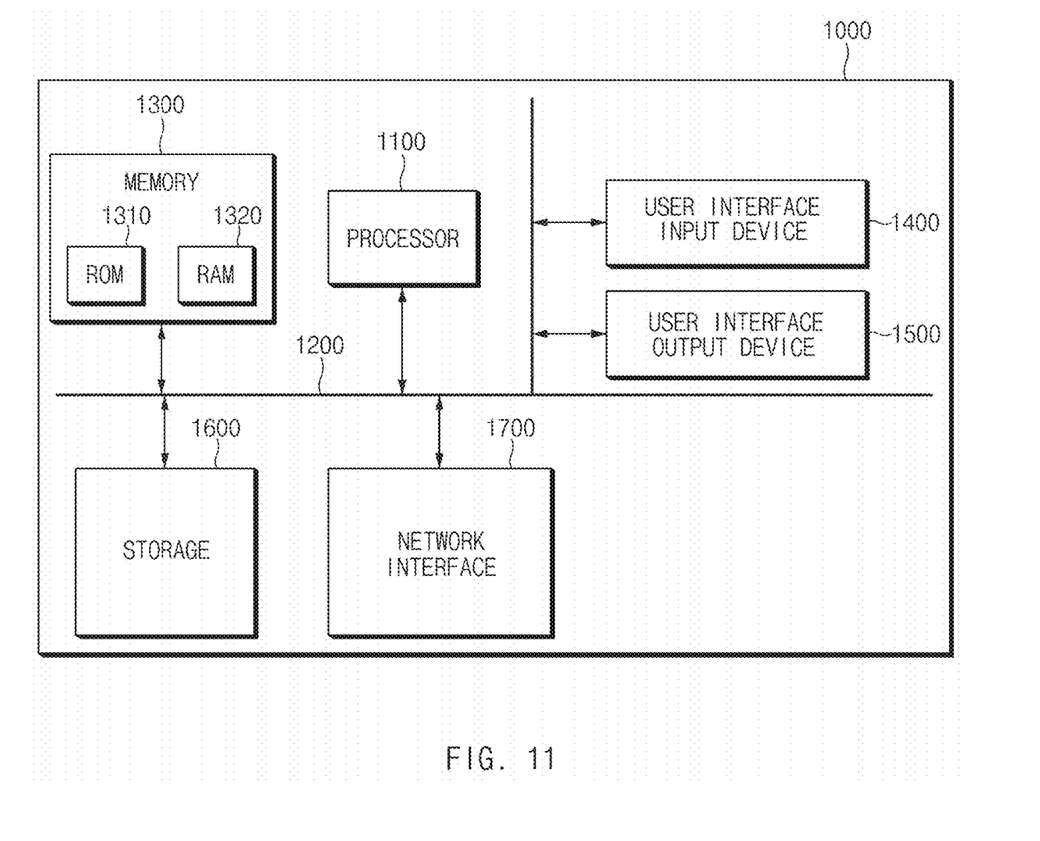
FIG. 11 is a block diagram illustrating a computer system according to an embodiment of the present disclosure.

FIG. 11 is a block diagram illustrating a computer system according to an embodiment of the present disclosure.

Referring to FIG. 11, a computing system 1000 may include at least one processor 1100, a memory 1300, a user interface input device 1400, a user interface output device 1500, storage 1600, and an interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (e.g., the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), or the like.

A storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present disclosure have been described for illustrative purposes, those skilled in the art will appreciate that various modifications, additions and substitutions are possible, without departing from the scope and spirit of the disclosure.

Therefore, the embodiments disclosed in the present disclosure are provided for the sake of descriptions, not limiting the technical concepts of the present disclosure, and it should be understood that such embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for detecting an object, the apparatus comprising:
    at least one processor configured to extract information for object detection from image data frames based on a hierarchical structure of a convolutional neural network (CNN) and transmit information for object detection extracted from an uppermost layer of the hierarchical structure to a lower layer to detect an object based on information received at each layer; and
    storage configured to store the information for object detection and detected object information,
    wherein the at least one processor further includes a hidden state top-down structure for receiving the feature information and the contextual information extracted for each layer of each image data frame; and
    wherein the hidden state top-down structure includes a plurality of hidden state layers corresponding to a layer of the backbone network, and an uppermost hidden state layer sequentially transmits the contextual information received from the layer of the backbone network to a hidden state layer of the lower layer.

2. The apparatus of claim 1, wherein the at least one processor is configured to detect the object in an one-stage scheme.

3. The apparatus of claim 2, wherein the at least one processor is configured to correct the detected object information by using the information for object detection.

4. The apparatus of claim 1, wherein the information for object detection includes feature information for large object detection and contextual information for small object detection.

5. The apparatus of claim 1, wherein the at least one processor includes a backbone network for extracting feature information for object detection and contextual information from the image data frames.

6. The apparatus of claim 5, wherein the backbone network includes a scale-based hierarchical feature structure for each of the image data frames, and is configured to substitute time-series data for data for each scale of the scale-based hierarchical feature structure and output the time-series data.

7. The apparatus of claim 1, wherein the hidden state top-down structure includes:
    a first hidden state layer configured to perform the object detection by using first feature information and first contextual information which are received from a first layer which is an uppermost layer of the backbone network;
    a second hidden state layer configured to perform the object detection by using the first contextual information received from the first hidden state layer and second feature information and second contextual information received from a second layer of the backbone network; and
    a third hidden state layer configured to perform the object detection by using the first contextual information and the second contextual information received from the second hidden state layer, and third feature information and third contextual information received from a third layer of the backbone network.

8. The apparatus of claim 7, wherein the at least one processor further includes a recursive prediction module configured to receive the feature information and the contextual information from the hidden state top-down structure to correct a detection result received from the hidden state top-down structure.

9. The apparatus of claim 8, wherein the recursive prediction module is configured to repeatedly perform the correction of the detection result.

10. The apparatus of claim 8, wherein the recursive prediction module is configured to remove a feature corresponding to a background of a detection result by the hidden state top-down structure by using an attention mask.

11. A method of detecting an object, the method comprising:
    extracting information for object detection from image data frames based on a hierarchical structure of a convolutional neural network (CNN); and
    transmitting information for object detection extracted from an uppermost layer of the hierarchical structure to a lower layer to detect an object based on information received at each layer,
    wherein the detecting of the objecting includes:
    receiving feature information and contextual information extracted for each layer of the backbone network; and
    detecting, by a plurality of hidden state layers corresponding to a layer of the backbone network, the object based on the feature information and the contextual information received fro the layer of the backbone network.

12. The method of claim 11, further comprising:
corrcting the detected object information by using the information for object detection.

13. The method of claim 12, wherein the extracting of the information for the object detection includes:
in a backbone network having a scale-based hierarchical feature structure for each of the image data frames, substituting time-series data for data for each scale of the scale-based hierarchical feature structure.

14. The method of claim 11, wherein the detecting of the object further includes:
sequentially transmitting, by an uppermost hidden state layer among the plurality of hidden state top-down layers, the contextual information received from the layer of the backbone network to a hidden state layer of the lower layer.

15. The method of claim 14, wherein the sequential transmitting of the contextual information to the hidden state layer of the lower layer includes:
performing the object detection by using first feature information and first contextual information which are received from a first layer which is an uppermost layer of the backbone network in a first hidden state layer among the plurality of hidden state top-down layers;
performing the object detection in a second hidden state layer among the plurality of hidden state top-down layers by using the first contextual information received from the first hidden state layer and second feature information and second contextual information received from a second layer of the backbone network; and
performing the object detection in a third hidden state layer among the plurality of hidden state top-down layers by using the first contextual information and the second contextual information received from the second hidden state layer and third feature information and third contextual information received from received from a third layer of the backbone network.

16. The method of claim 12, wherein the correcting of the detected object information includes:
receiving the feature information and the contextual information from the hidden state top-down layer to correct a detection result received from the hidden state top-down layer.

17. The method of claim 16, wherein the correcting of the detected object information includes:
removing a feature corresponding to a background of a detection result by the hidden state top-down layer by using an attention mask.

* * * * *